United States Patent
Gummadi et al.

(10) Patent No.: US 9,996,164 B2
(45) Date of Patent: Jun. 12, 2018

(54) SYSTEMS AND METHODS FOR RECORDING CUSTOM GESTURE COMMANDS

(71) Applicant: QUALCOMM Incorporated, San Diego, CA (US)

(72) Inventors: Bapineedu Chowdary Gummadi, Hyderabad (IN); Venkata A Naidu Babbadi, Hyderabad (IN); Hem Agnihotri, Varanasi (IN); Anurag Tiwari, Hardoi (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days. days.

(21) Appl. No.: 15/273,284

(22) Filed: Sep. 22, 2016

(65) Prior Publication Data

US 2018/0081447 A1  Mar. 22, 2018

(51) Int. Cl.
| | |
|---|---|
| G06F 3/01 | (2006.01) |
| G06F 3/0482 | (2013.01) |
| G06F 3/0484 | (2013.01) |
| G06F 3/03 | (2006.01) |
| G06F 3/16 | (2006.01) |
| G06F 21/00 | (2013.01) |
| G06K 9/00 | (2006.01) |
| H04M 1/725 | (2006.01) |

(52) U.S. Cl.
CPC ............ *G06F 3/017* (2013.01); *G06F 3/012* (2013.01); *G06F 3/0304* (2013.01); *G06F 3/0482* (2013.01); *G06F 3/0484* (2013.01); *G06F 3/167* (2013.01); *G06F 21/00* (2013.01); *G06K 9/00221* (2013.01); *G06K 9/00335* (2013.01); *H04M 1/72522* (2013.01); *H04M 2250/52* (2013.01)

(58) Field of Classification Search
CPC ...... G06F 3/017; G06F 3/0304; G06F 3/0484; G06F 3/0482; G06F 3/012; G06F 3/167
See application file for complete search history.

(56) References Cited

U.S. PATENT DOCUMENTS

| | | |
|---|---|---|
| 6,421,453 B1 | 7/2002 | Kanevsky et al. |
| 8,453,058 B1 | 5/2013 | Coccaro et al. |
| 2002/0075334 A1 | 6/2002 | Yfantis |
| 2007/0283296 A1 | 12/2007 | Nilsson |

(Continued)

FOREIGN PATENT DOCUMENTS

| | | |
|---|---|---|
| WO | 2014113507 A1 | 7/2014 |
| WO | 2016024094 A1 | 2/2016 |

OTHER PUBLICATIONS

International Search Report and Written Opinion—PCT/US2017/047722—ISA/EPO—dated Nov. 7, 2017.

*Primary Examiner* — Andrew Sasinowski

(74) *Attorney, Agent, or Firm* — Muncy, Geissler, Olds & Lowe, P.C.

(57) ABSTRACT

Methods and apparatuses are disclosed for recording a custom gesture command. In an aspect, at least one camera of a user device captures the custom gesture command, wherein the custom gesture command comprises a physical gesture performed by a user of the user device, a user interface of the user device receives user selection of one or more operations of the user device, and the user device maps the custom gesture command to the one or more operations of the user device.

27 Claims, 5 Drawing Sheets

(56) References Cited

U.S. PATENT DOCUMENTS

| | | |
|---|---|---|
| 2011/0304541 A1 | 12/2011 | Dalal |
| 2012/0078635 A1 | 3/2012 | Rothkopf et al. |
| 2013/0127712 A1 | 5/2013 | Matsubayashi |
| 2013/0179173 A1 | 7/2013 | Lee et al. |
| 2014/0009378 A1 | 1/2014 | Chew |
| 2014/0309865 A1* | 10/2014 | Ricci .................... H04W 48/04 701/36 |
| 2015/0177937 A1* | 6/2015 | Poletto ................ G06F 3/0484 715/739 |
| 2016/0011668 A1 | 1/2016 | Gilad-Bachrach et al. |
| 2016/0125880 A1 | 5/2016 | Zhang et al. |
| 2016/0259525 A1* | 9/2016 | Li ...................... G06F 3/04817 |

* cited by examiner

| 202 | 204 | 206 | 208 |
|---|---|---|---|
| User_ID1a | Gesture1 | Operation1 | Preferences1 |
| | | Operation2 | |
| User_ID1b | Gesture2 | Operation3 | Preferences2 |
| | | Operation4 | |
| | | Operation5 | |
| User_ID2 | Gesture3 | Operation1 | Preferences3 |
| | | Operation2 | |
| | Gesture4 | Operation6 | Preferences4 |

...

| | | | |
|---|---|---|---|
| User_IDn | Gesture1 | Operation1 | PreferencesN |
| | | Operation2 | |
| | Gesture5 | Operation7 | |
| | | Operation6 | |

*FIG. 2*

SYSTEMS AND METHODS FOR RECORDING CUSTOM GESTURE COMMANDS

INTRODUCTION

Aspects relate to recording custom gesture commands.

It is often desirable for a user device (e.g., a cell phone) to support one or more types of "hands-free" operations. For example, when the user is driving a car, it can be dangerous (and, in some jurisdictions, illegal) for the user to operate certain features of the user device's user interface, such as entering sequences of keypresses on the user device's keypad. Consequently, some user devices permit the use of audio commands as a replacement for such input.

Additionally, gesture input commands are becoming more popular for "hands-free" inputs. Such commands provide a similar advantage to audio commands insofar as the user does not need to enter sequences of keypresses on the user device's keypad in order to perform operations with the user device. However, like audio commands, gesture commands are limited to specific gestures and/or specific operations predefined by the user device operating system or gesture-detecting software.

SUMMARY

The following presents a simplified summary relating to one or more aspects disclosed herein. As such, the following summary should not be considered an extensive overview relating to all contemplated aspects, nor should the following summary be regarded to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

A method for recording a custom gesture command includes capturing, by at least one camera of a user device, the custom gesture command, wherein the custom gesture command comprises a physical gesture performed by a user of the user device, receiving, at a user interface of the user device, user selection of one or more operations of the user device, and mapping, by the user device, the custom gesture command to the one or more operations of the user device.

An apparatus for recording a custom gesture command includes at least one camera, a user interface, and at least one processor configured to: cause the at least one camera to capture the custom gesture command, wherein the custom gesture command comprises a physical gesture performed by a user of the apparatus, cause the user interface to receive user selection of one or more operations of the apparatus, and map the custom gesture command to the one or more operations of the apparatus.

An apparatus for recording a custom gesture command includes at least one image capturing means, a user interface means, and a processing means configured to: cause the at least one image capturing means to capture the custom gesture command, wherein the custom gesture command comprises a physical gesture performed by a user of the apparatus, cause the user interface means to receive user selection of one or more operations of the apparatus, and map the custom gesture command to the one or more operations of the apparatus.

A non-transitory computer-readable medium for recording a custom gesture command includes at least one instruction to cause at least one camera of a user device to capture the custom gesture command, wherein the custom gesture command comprises a physical gesture performed by a user of the user device, at least one instruction to cause a user interface of the user device to receive user selection of one or more operations of the user device, and at least one instruction to cause the user device to map the custom gesture command to the one or more operations of the user device.

Other objects and advantages associated with the aspects disclosed herein will be apparent to those skilled in the art based on the accompanying drawings and detailed description.

BRIEF DESCRIPTION OF THE DRAWINGS

A more complete appreciation of aspects of the disclosure will be readily obtained as the same becomes better understood by reference to the following detailed description when considered in connection with the accompanying drawings which are presented solely for illustration and not limitation of the disclosure, and in which:

FIG. 2 illustrates exemplary user profiles according to at least one aspect of the disclosure.

DETAILED DESCRIPTION

Figure 1:
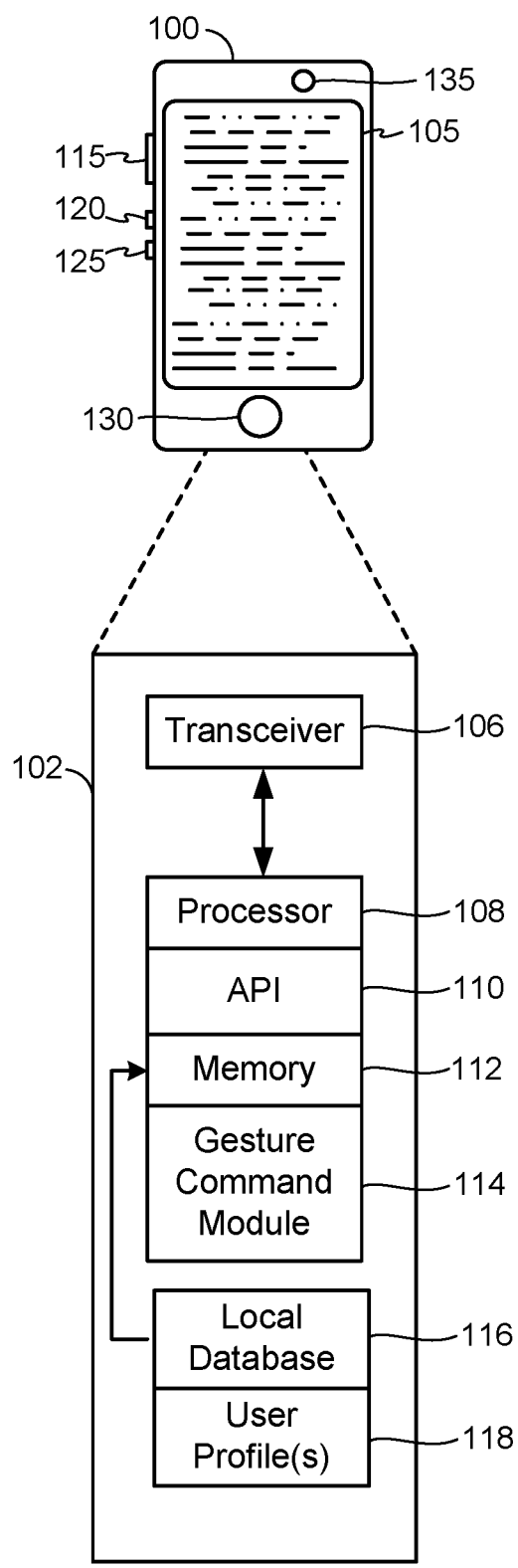
FIG. 1 illustrates examples of a user device in accordance with aspects of the disclosure.

Methods and apparatuses are disclosed for recording a custom gesture command. In an aspect, at least one camera of a user device captures the custom gesture command, wherein the custom gesture command comprises a physical gesture performed by a user of the user device, a user interface of the user device receives user selection of one or more operations of the user device, and the user device maps the custom gesture command to the one or more operations of the user device.

These and other aspects of the disclosure are disclosed in the following description and related drawings directed to specific aspects of the disclosure. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

A user device may be mobile or stationary, and may communicate with a wired access network and/or a radio access network (RAN). The term "user device" may be referred to interchangeably as an "access terminal" or "AT," a "wireless device," a "subscriber device," a "subscriber terminal," a "subscriber station," a "user terminal" or "UT," a "mobile device," a "mobile terminal," a "mobile station," a "user equipment" or "UE," and variations thereof.

In an aspect, a user device can communicate with a core network via the RAN, and through the core network the user device can be connected with external networks such as the Internet. Of course, other mechanisms of connecting to the core network and/or the Internet are also possible for the user device, such as over wired access networks, WiFi networks (e.g., based on IEEE 802.11, etc.), and so on. User devices can be embodied by any of a number of types of devices including but not limited to cellular telephones (e.g., smartphones, feature phones, etc.), personal digital assistants (PDAs), laptop computers, desktop computers, tablet computers, wireless or wireline phones, and so on.

A communication link through which a user device can send signals to the RAN is called an uplink channel (e.g., a reverse traffic channel, a reverse control channel, an access channel, etc.). A communication link through which the RAN can send signals to the user device is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

FIG. 1 illustrates an example of a user device in accordance with aspects of the disclosure. Referring to FIG. 1, a user device 100 is illustrated as a touchscreen device (e.g., a smartphone, a tablet computer, etc.). As shown in FIG. 1, an external casing of the user device 100 is configured with a touchscreen display 105, peripheral buttons 115, 120, and 125 (e.g., a power control button, volume or vibrate control buttons, an airplane mode toggle button, etc.), at least one front-panel button 130 (e.g., a Home button, etc.), and a front-facing (i.e., on the same side of the user device as the touchscreen display 105) camera 135, among other components, as is known in the art. While not shown explicitly as part of user device 100, user device 100 can include one or more microphones, one or more speakers, and a rear-facing (i.e., on the opposite side of the user device from the touchscreen display 105) camera, as is known in the art. Similarly, while not shown explicitly in FIG. 1, user device 100 can include one or more external antennas and/or one or more integrated antennas that are built into the external casing of user device 100, including but not limited to WiFi antennas, cellular antennas, satellite position system (SPS) antennas (e.g., global positioning system (GPS) antennas), and so on.

While internal components of user devices, such as user device 100, can be embodied with different hardware configurations, a basic high-level user device configuration of internal hardware components is shown as platform 102 in FIG. 1. The platform 102 can receive and execute software applications, data and/or commands transmitted from the RAN that may ultimately come from the core network, the Internet and/or other remote servers and networks. The platform 102 can also independently execute locally stored applications without RAN interaction. The platform 102 can include a transceiver 106 operably coupled to at least one processor 108. The processor 108 or executes an application programming interface (API) 110 layer that interfaces with any resident programs in a memory 112 of the user device 100. The memory 112 can be comprised of read-only memory (ROM), random-access memory (RAM), electrically erasable programmable ROM (EEPROM), flash cards, or any memory common to computer platforms. The platform 102 can further include a gesture command module 114. The gesture command module 114 may be a software module stored in memory 112 that, when executed by the processor 108, causes the processor 108, the front-facing camera 135, the touchscreen display 105, etc. (collectively referred to as the user device 100 for simplicity) to perform the functionality described herein. Alternatively, the gesture command module 114 may be a hardware circuit, optionally coupled to the processor 108, configured to perform, or cause the user device 100 to perform, the functionality described herein. The platform 102 also can include a local database 116 that can store applications not actively used in the memory 112, as well as other data. The local database 116 is typically a flash memory cell, but can be any secondary storage device as known in the art, such as magnetic media, EEPROM, optical media, tape, soft or hard disk, or the like. As will be described further herein, the local database 116 may include one or more user profiles 118.

Accordingly, an aspect of the disclosure can include a user device (e.g., user device 100, etc.) including the ability to perform the functions described herein. As will be appreciated by those skilled in the art, the various logic elements can be embodied in discrete elements, software modules executed on a processor, or any combination of software and hardware to achieve the functionality disclosed herein. For example, the processor 108, the API 110, the memory 112, the gesture command module 114, the local database 116 (e.g., user profile(s) 118) may all be used cooperatively to load, store and execute the various functions disclosed herein and thus the logic to perform these functions may be distributed over various elements. Alternatively, the functionality could be incorporated into one discrete component. Therefore, the features of the user device 100 should be considered merely illustrative and the disclosure is not limited to the illustrated features or arrangement.

As noted above, gesture input commands are becoming more popular for "hands-free" inputs. Such commands provide a similar advantage to audio commands insofar as the user does not need to enter sequences of keypresses on the user device's keypad in order to perform operations with the user device. However, like audio commands, gesture commands are limited to specific gestures and/or specific operations predefined by the user device operating system or gesture-detecting software.

Accordingly, the present disclosure provides a mechanism to, among other things, allow a user to record custom gesture commands and map those commands to user-selected operations of the user device, such as user device 100. For example, the user may wish to record a custom gesture command for the operation of opening a particular application. In this example, the user may decide to configure the "thumbs-up" gesture as indicating that the user wishes to open the particular application. As another example, the user may wish to record a custom gesture command for the operation of taking a picture. In this example, the user may configure a finger snap gesture as indicating that the user device 100 should capture a picture with its rear-facing camera.

The user's ability to both record a custom gesture command and select to which operations of the user device to map the recorded custom gesture commands can be very useful in emergency scenarios as well. For example, the user could configure the "okay" hand sign as a gesture for emergency scenarios. In this example, the user could map the "okay" hand sign to the operation of calling 9-1-1 or other emergency contact number, or to the user device 100 emitting a siren or other audible alarm.

Where there is a single user of the user device 100, the user profile 118 may include at least a mapping of data representing the one or more custom gesture commands recorded by the user or a pointer to data representing the one or more custom gesture commands, and the operation or operations mapped to each of the one or more custom gesture commands. The data representing a custom gesture command may be a video recording of the custom gesture command or data points extracted from and/or representing a video recording of the custom gesture command.

In an aspect, multiple users may configure their own custom gesture commands for the same user device (e.g., user device 100). Each user may have a user profile 118 on the user device 100 that stores at least a mapping of an identifier of the user, data representing one or more custom gesture commands or a pointer to data representing the one or more custom gesture commands, and the operation or operations mapped to each of the one or more custom gesture commands. Where different users can login to the user device 100, the identifier of the user may be login information of the user, such as a username and password, a passcode, a personal identification number, etc. Alternatively, or additionally, the identifier of the user may be an image of the user's face, or a pointer to an image of the user's face, to be used by facial recognition software to determine which user is looking at the user device 100, or the identifier may be the actual facial recognition data or a pointer to the actual facial recognition data. In another aspect, the identifier of the user may be voice recognition data for the user, such that the user can speak a command to identify himself.

In an aspect, a user may set multiple ways to be identified by the user device 100. For example, a user may cause the user device 100 to store both voice recognition and facial recognition data, or to store both login data and voice recognition data. The user may set a preference that they wish to be identified using either or both of these identification methods. This may provide added security, such as in cases where more than one user is detected as looking at the touchscreen display 105. In an aspect, the user may also set such preferences for only certain custom gesture commands.

Thus, when in the gesture command input mode, the user device 100 will first determine which user is making the gesture command and then determine to which operation(s) the detected gesture command corresponds based on the information in the user profiles 118.

FIG. 2 illustrates exemplary user profiles 118 according to at least one aspect of the disclosure. In the example of FIG. 2, there are n users of the user device 100 with user identifier information in column 202, where n is greater than two. However, as will be appreciated, there may be only one or two users of the user device 100. As illustrated in FIG. 2, a first user has two user identifiers in column 202, User_ID1*a* and User_ID1*b*, which may be, as an example, facial recognition data and voice recognition data. The first user is associated with two custom gesture commands in column 204. The first custom gesture command, Gesture1, maps to two operations of the user device 100 in column 206, Operation1 and Operation2 206. The second custom gesture command, Gesture2, maps to three operations of the user device 100 in column 206, Operation3, Operation4, and Operation5. Each custom gesture command in column 204 is associated with preferences in column 208. For example, Preferences1 may indicate that for Gesture1, detection of both User_ID1*a* and User_ID1*b* is required to identify the user before performing Operation1 and Operation2, while Preferences2 may indicate that for Gesture2, detection of either or a particular one of User_ID1*a* and User_ID1*b* is required to identify the user before performing Operation1 to Operation3.

As further illustrated in FIG. 2, a second user has a single user identifier in column 202, User_ID2, which may be, as an example, facial recognition data. The second user is also associated with two custom gesture commands in column 204. The first custom gesture command, Gesture3, maps to two operations of the user device 100 in column 206, Operation1 and Operation2 (the same Operation1 and Operation2 as for the first user). The second custom gesture command, Gesture4, maps to a single operation of the user device 100 in column 206, Operation6. Each custom gesture command in column 204 is associated with preferences in column 208, Preferences3 and Preferences4.

As further illustrated in FIG. 2, an nth user has a single user identifier in column 202, User_IDn, which may be, as an example, voice recognition data. The nth user is also associated with two custom gesture commands in column 204. The first custom gesture command, Gesture1 (representing the same gesture as Gesture1 represents for the first user), maps to two operations of the user device 100 in column 206, Operation1 and Operation2 (the same Operation1 and Operation2 as for the first user). The second custom gesture command, Gesture5, also maps to two operations of the user device 100 in column 206, Operation7 and Operation6 (the same Operation6 as for the second user). Each custom gesture command in column 204 is associated with the same preferences in column 208, PreferencesN.

As will be appreciated by one of ordinary skill in the art, the examples provided above are not exhaustive, and there are any number of users, gestures, operations, preferences, and combinations thereof within the scope of the present disclosure.

Figure 3:
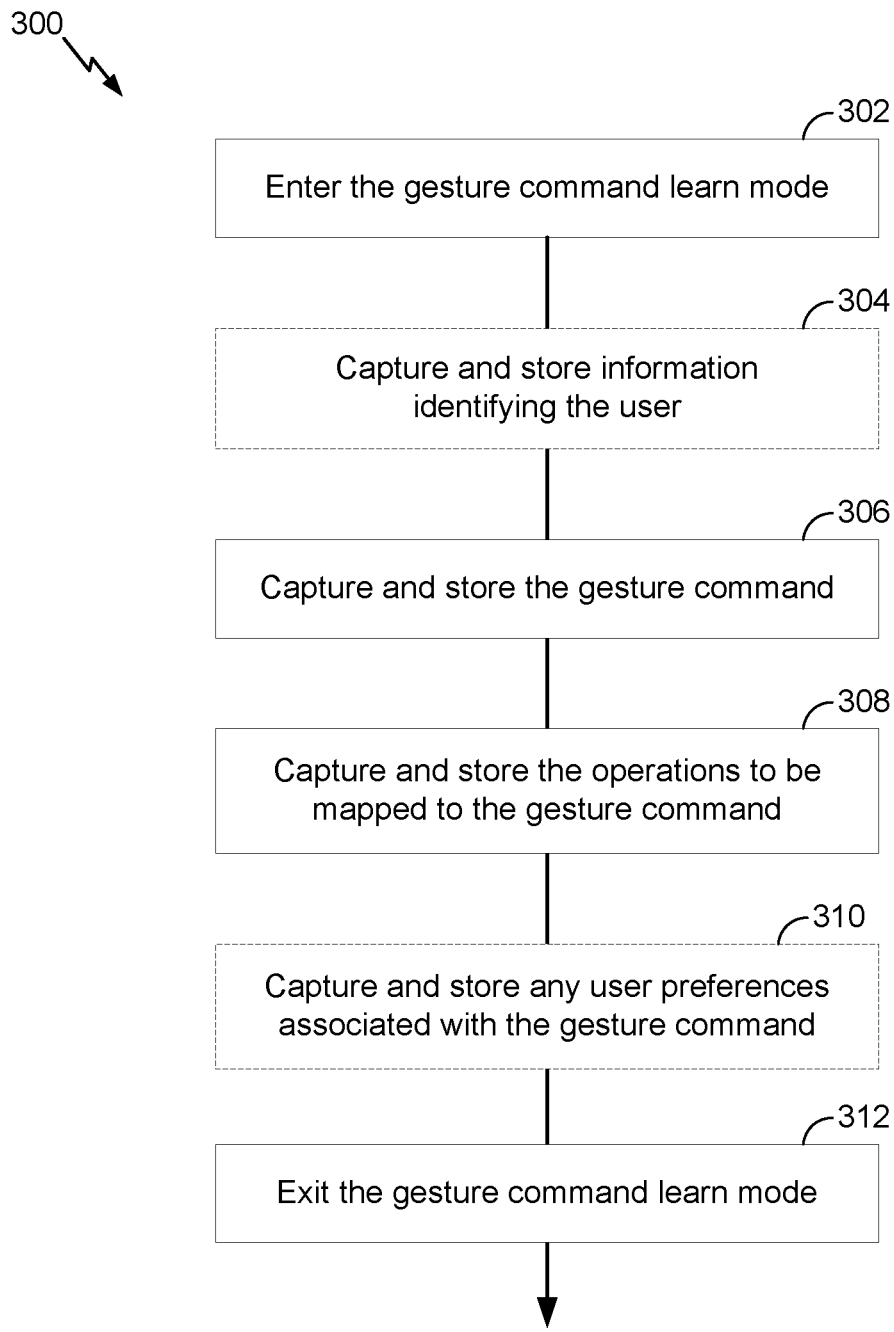
FIG. 3 illustrates an exemplary flow for recording a custom gesture command according to at least one aspect of the disclosure.

FIG. 3 illustrates an exemplary flow 300 for recording a custom gesture command according to at least one aspect of the disclosure. The flow 300 may be performed by the user device 100.

At 302, the user device 100 (e.g., the processor 108 in conjunction with the gesture command module 114 and/or the touchscreen display 105) enters a gesture command learn mode in which the user device 100 can map custom gesture commands to user-selected operations of the user device 100. To enter the gesture command learn mode, the user may first select an icon displayed on the touchscreen display 105 representing the gesture command module 114. Upon selection of the icon representing the gesture command module 114, the processor 108 loads and executes the gesture command module 114. Once loaded and being executed, the user interface for the gesture command module 114 displayed on the touchscreen display 105 may include a "gesture command learn mode" icon, or some similar icon that can be selected to enter the gesture command learn mode.

At 304, the user device 100 (e.g., the processor 108 in conjunction with the gesture command module 114, the touchscreen display 105, the memory 112, the local database 116, and/or user profile(s) 118) optionally captures and stores information identifying the user. Operation 304 is optional because there may be only one user of the user device 100, and therefore no need to distinguish between users, or the user may decide that the custom gesture commands should be the same for all users of the user device 100. For example, where the user device 100 is a smart television, the primary user may decide that, rather than each family member have their own profile for custom gesture commands, all family members should use the same custom gesture commands to perform the same operations on the television.

To capture and store information identifying the current user, the user may select a menu option representing the type of identifying information with which the user wishes to be identified when entering custom gesture commands. For example, the gesture command module 114 may display (or cause the processor 108 to display) menu options on the touchscreen display 105 corresponding to "voice recognition," "facial recognition," "passcode," etc. Upon selection of such a menu option, the user device 100 can capture words spoken by the user, an image of the user's face, the user's passcode, etc. After capturing this information, the user device 100 can store the audio file of the user's voice, the image of the user's face, the passcode, etc. in the user profile 118 (e.g., column 202). Alternatively, or additionally, the user device 100 can store voice recognition data representing the user's voice and/or facial recognition data representing the user's face in the user profile 118 instead of the actual audio and/or image files.

At 306, the user device 100 (e.g., the processor 108 in conjunction with the gesture command module 114, the front-facing camera 135, and/or user profile(s) 118) captures the custom gesture command and stores data representing the custom gesture command in the user profile 118. More specifically, the gesture command module 114 may instruct the user, via the touchscreen display 105, to perform the gesture as the user will perform it when using the custom gesture command in the future, and in such a way that it can be captured (e.g., videoed) by the appropriate camera of the user device 100 (e.g., the front-facing camera 135 and/or the rear-facing camera), depending on the type of gesture.

In an aspect, the custom gesture command may be a single gesture captured by a single camera of the user device 100. For example, the user may wish to record a finger snap as the custom gesture command. In that case, the user will snap his or her fingers in front of the front-facing camera 135 of the user device 100 as he or she will do so when using the custom gesture command in the future. In another aspect, the custom gesture command may be two discrete gestures captured by a single camera of the user device 100. For example, the custom gesture command may be a combination of a facial gesture and a hand gesture, and the front-facing camera 135 may capture both the facial gesture and the hand gesture. The user may perform the facial gesture and the hand gesture simultaneously or sequentially as he or she will do so when using the custom gesture command in the future. In yet another aspect, the custom gesture command may be two discrete gestures captured by two different cameras of the user device 100. For example, the custom gesture command may be a combination of a facial gesture and a hand gesture, and the front-facing camera 135 may capture the facial gesture while the rear-facing camera captures the hand gesture. Again, the user may perform the facial gesture and the hand gesture simultaneously or sequentially as he or she will do so when using the custom gesture command in the future.

In still another aspect, the user of the user device 100 may record a gesture of another user as the custom gesture command. For example, the user of the user device 100 may record a gesture (e.g., a facial gesture, a hand gesture, etc.) made by a friend as mapping to the operation of playing a specific video of that friend. In that way, when the user's friend makes the custom gesture command that he or she recorded on the user's user device 100, the video of that friend will be opened and played.

Upon successfully capturing the gesture at 306, the user device 100 can store data representing the custom gesture command in the user profile 118 (e.g., column 204).

At 308, the user device 100 (e.g., the processor 108 in conjunction with the gesture command module 114, the touchscreen display 105, and/or the user profile(s) 118) captures and stores the operation(s) of the user device 100 to be mapped to the custom gesture command recorded at 306. More specifically, the gesture command module 114 may instruct the user, via the touchscreen display 105, to perform the operation(s) of the user device 100 that the user wishes to map to the custom gesture command recorded at 306. For example, if the user wishes to map the custom gesture command recorded at 306 to the action of taking a picture, the user can perform the operations of opening the camera application, taking a picture, and closing the camera application. These operations are then stored in the user profile 118 (e.g., column 206) as discreet operations, for example, as Operation3, Operation4, and Operation5.

At 310, the user device 100 (e.g., the processor 108 in conjunction with the gesture command module 114, the touchscreen display 105, and/or the user profile(s) 118) optionally captures and stores any preferences associated with the custom gesture command. Operation 310 is optional because the user may not have any preferences associated with the custom gesture command. However, any such preferences will be stored in the user profile 118 (e.g., column 208). Continuing the above example, the user may set a preference that the finger snap gesture be recognized for all users of the user device 100 as the custom gesture command for the action of taking a picture, regardless of other user profiles that may be present on the user device 100.

At 312, the user device 100 (e.g., the processor 108 in conjunction with the gesture command module 114 and/or the touchscreen display 105) exits the gesture command learn mode. For example, the user can select an "exit" option on the user interface for the gesture command module 114 displayed on the touchscreen display 105. Alternatively, the user can select a "back" or "home" button on the user device 100 itself.

As will be appreciated, operations 304 to 310 do not need to be performed in the order illustrated in FIG. 3. Rather, they can be performed in any order.

Figure 4:
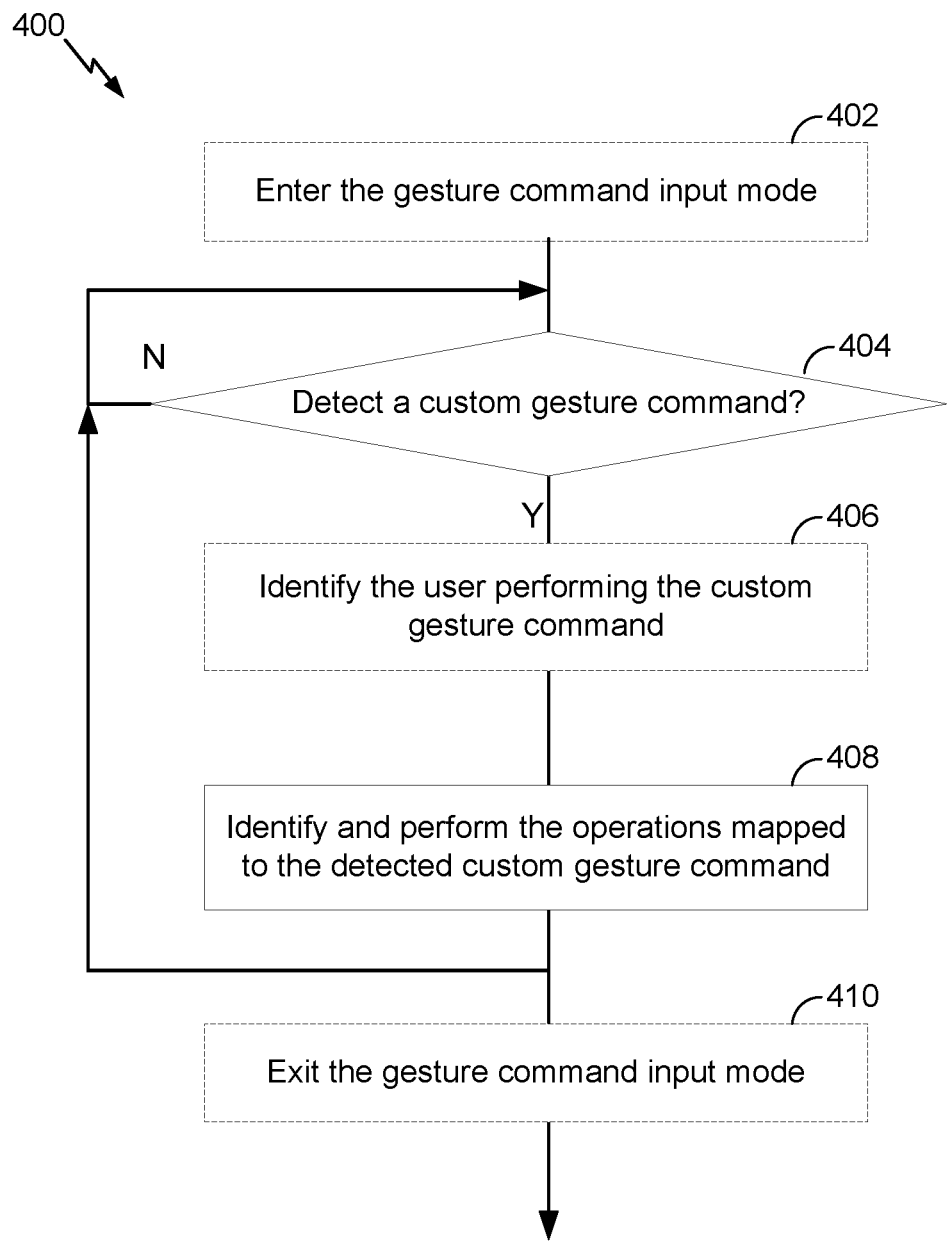
FIG. 4 illustrates an exemplary flow for utilizing a custom gesture command according to at least one aspect of the disclosure.

FIG. 4 illustrates an exemplary flow 400 for utilizing a custom gesture command according to at least one aspect of the disclosure. The flow 400 may be performed by the user device 100.

At 402, the user device 100 (e.g., the processor 108 in conjunction with the gesture command module 114 and/or the touchscreen display 105) optionally enters a gesture command input mode. Operation 402 is optional because the user device may always be in the gesture command input mode. Otherwise, the user may cause the user device 100 to enter the gesture command input mode by selecting an icon displayed on the touchscreen display 105 representing the gesture command module 114. Upon selection of the icon representing the gesture command module 114, the processor 108 loads and executes the gesture command module 114. Once loaded and being executed, the user interface for the gesture command module 114 displayed on the touchscreen display 105 may include a "gesture command input mode" icon, or some similar icon that can be selected to enter the gesture command input mode. Upon entering the gesture command input mode, the gesture command module 114 may be minimized and continue running in the background.

Alternatively, rather than selecting an icon to enter the gesture command input mode, the custom gesture command input mode may be entered in response to a voice command from the user. The voice command may be a custom voice command recorded by the user and mapped to the launch of the gesture command input mode, or may be a predefined voice command set by the gesture command module 114, for example. As yet another alternative, the custom gesture command input mode may be entered in response to detection of a gesture command performed by the user. Similar to the voice command, the gesture command may be a custom gesture command recorded by the user or a predefined gesture command set by the gesture command module 114, for example.

At 404, the gesture command module 114 (in conjunction with the front-facing camera 135) determines whether a user in view of the front-facing camera 135 has performed any of the custom gesture commands stored in the user profile 118 (e.g., column 204). For example, while in the gesture command input mode, the front-facing camera 135 may continuously stream captured video data to the gesture command module 114. The gesture command module 114 may interpret the video data received from the front-facing camera 135 to detect and identify gestures matching any of the custom gesture commands stored in the user profile 118.

At 406, upon detecting a custom gesture command at 404, the gesture command module 114 (in conjunction with the front-facing camera 135, the touchscreen display 105, and/or the user profile(s) 118) optionally identifies the current user. Operation 406 is optional because the user device 100 may not distinguish between different users. Otherwise, the gesture command module 114 identifies the user based on the identifying information (column 202) and possibly preferences (column 208) stored in the user profile 118. For example, where the identifying information is a passcode, the gesture command module 114 can determine which user is logged in to the user device 100. Alternatively, where the identifying information is facial recognition data, the user device 100 can determine which user is looking at the user device 100 (e.g., using the front-facing camera 135 to capture an image or video of the user).

At 408, the gesture command module 114 (in conjunction with the processor 108) identifies and performs the operations associated with the custom gesture command detected at 404. More specifically, the gesture command module 114 identifies the operations in the user profile 118 (e.g., column 206) that map to the custom gesture command (e.g., column 204) detected in 404 performed by the user identified in 406 (if performed). The gesture command module 114 then causes the user device 100 to perform the identified operations.

If the user device 100 remains in the gesture command input mode, then the flow 400 returns to 404. Otherwise, at 410, the user device 100 (e.g., the processor 108 in conjunction with the gesture command module 114 and/or the touchscreen display 105) exits the gesture command input mode. Similar to entering the gesture command input mode, the user may select an icon to exit the gesture command input mode. Alternatively, the custom gesture command input mode may be exited in response to a voice command from the user. The voice command may be a custom voice command recorded by the user and mapped to the exit of the gesture command input mode, or may be a predefined voice command set by the gesture command module 114, for example. As yet another alternative, the custom gesture command input mode may be exited in response to detection of a gesture command performed by the user. Similar to the voice command, the gesture command may be a custom gesture command recorded by the user or a predefined gesture command set by the gesture command module 114, for example.

Figure 5:
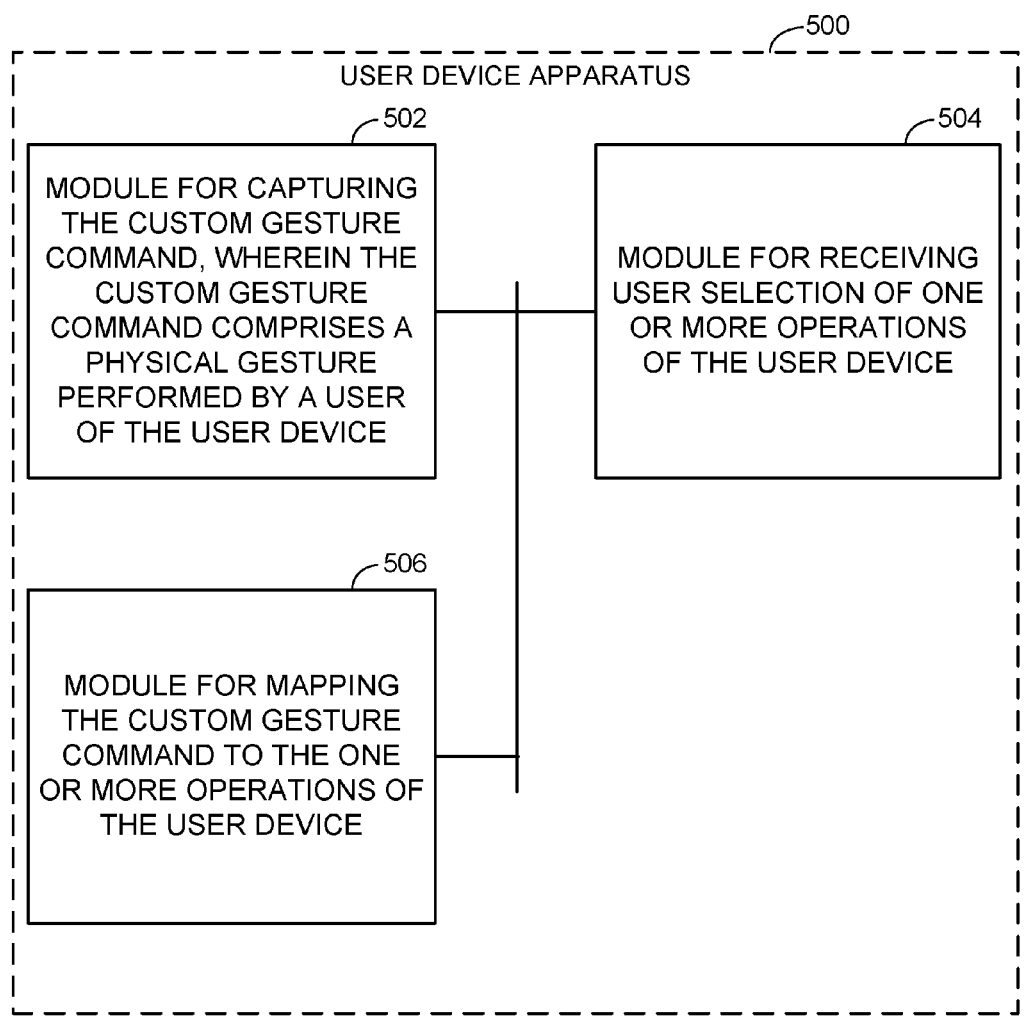
FIG. 5 is a simplified block diagram of several sample aspects of an apparatus configured to support operations as taught herein.

FIG. 5 illustrates an example user device apparatus 500 represented as a series of interrelated functional modules. A module for capturing 502 may correspond at least in some aspects to, for example, an image capturing device (e.g., front-facing camera 135) as discussed herein. A module for receiving 504 may correspond at least in some aspects to, for example, a user interface and/or a processing system (e.g., touchscreen display 105 and/or processor 108) as discussed herein. A module for mapping 506 may correspond at least in some aspects to, for example, a processing system in conjunction with a storage device (e.g., the processor 108 in conjunction with the user profile(s) 118) as discussed herein.

The functionality of the modules of FIG. 5 may be implemented in various ways consistent with the teachings herein. In some designs, the functionality of these modules may be implemented as one or more electrical components. In some designs, the functionality of these blocks may be implemented as a processing system including one or more processor components. In some designs, the functionality of these modules may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it will be appreciated that a given subset (e.g., of an integrated circuit and/or of a set of software modules) may provide at least a portion of the functionality for more than one module.

In addition, the components and functions represented by FIG. 5, as well as other components and functions described herein, may be implemented using any suitable means. Such means also may be implemented, at least in part, using corresponding structure as taught herein. For example, the components described above in conjunction with the "module for" components of FIG. 5 also may correspond to similarly designated "means for" functionality. Thus, in some aspects one or more of such means may be implemented using one or more of processor components, integrated circuits, or other suitable structure as taught herein.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method for recording a custom gesture command, comprising:
    capturing, by a front-facing camera and a rear-facing camera of a handheld user device, the custom gesture command, wherein the custom gesture command comprises a facial gesture and a hand gesture performed by a user of the handheld user device, and wherein the front-facing camera captures the facial gesture of the user and the rear-facing camera captures the hand gesture of the user;
    displaying, by a user interface of the handheld user device, an instruction to select a sequence of operations of the handheld user device to be mapped to the custom gesture command;
    in response to the instruction to select the sequence of operations, receiving, at the user interface of the handheld user device, user selection of the sequence of operations of the handheld user device to be mapped to the custom gesture command; and
    mapping, by the handheld user device, the custom gesture command to the sequence of operations of the handheld user device.

2. The method of claim 1, further comprising:
    entering, by the handheld user device, a custom gesture command learn mode before the custom gesture command is captured; and
    exiting, by the handheld user device, the custom gesture command learn mode after the custom gesture command is mapped to the sequence of operations.

3. The method of claim 1, further comprising:
    capturing, by the handheld user device, information identifying the user of the handheld user device.

4. The method of claim 3, wherein the information identifying the user of the handheld user device comprises voice recognition data representing a voice of the user, facial recognition data representing a face of the user, login information of the user, or any combination thereof.

5. The method of claim 3, further comprising:
mapping, by the handheld user device, the information identifying the user to the custom gesture command and the sequence of operations of the handheld user device.

6. The method of claim 1, further comprising:
capturing, by at least one camera of the handheld user device, a second custom gesture command, wherein the second custom gesture command comprises a physical gesture performed by a second user of the handheld user device;
receiving, at the user interface of the handheld user device, user selection of a one or more operations of the handheld user device; and
mapping, by the handheld user device, the second custom gesture command to the one or more operations of the handheld user device.

7. The method of claim 6, wherein the second custom gesture command is different from the custom gesture command and the one or more operations of the handheld user device are the same as the sequence of operations of the handheld user device.

8. The method of claim 1, further comprising:
detecting, by the handheld user device, the custom gesture command;
identifying, by the handheld user device, the sequence of operations of the handheld user device mapped to the custom gesture command; and
performing, by the handheld user device, the sequence of operations of the handheld user device mapped to the custom gesture command.

9. The method of claim 8, further comprising:
identifying, by the handheld user device, the user based on information identifying the user of the handheld user device stored in a user profile on the handheld user device,
wherein the sequence of operations of the handheld user device are identified based on matching the custom gesture command to the information identifying the user.

10. The method of claim 8, wherein the custom gesture command is detected by the front-facing camera and the rear-facing camera of the handheld user device.

11. The method of claim 8, further comprising:
entering a custom gesture command input mode before detecting the custom gesture command; and
exiting the custom gesture command input mode after performing the sequence of operations of the handheld user device mapped to the custom gesture command.

12. The method of claim 11, wherein the custom gesture command input mode is entered in response to detection of a voice command from the user, and wherein the custom gesture command input mode is exited in response to detection of a voice command from the user.

13. The method of claim 11, wherein the custom gesture command input mode is entered in response to detection of a first gesture command performed by the user, and wherein the custom gesture command input mode is exited in response to detection of a second gesture command performed by the user.

14. The method of claim 13, wherein the first gesture command and the second gesture command are custom gesture commands.

15. The method of claim 8, further comprising:
aborting the performance of the sequence of operations of the handheld user device in response to receiving a voice command from the user.

16. An apparatus for recording a custom gesture command, comprising:
a front-facing camera and a rear-facing camera of a handheld user device;
a user interface of the handheld user device; and
at least one processor of the handheld user device configured to:
cause the front-facing camera and the rear-facing camera to capture the custom gesture command, wherein the custom gesture command comprises a facial gesture and a hand gesture performed by a user of the handheld user device, and wherein the front-facing camera captures the facial gesture of the user and the rear-facing camera captures the hand gesture of the user;
cause the user interface to display an instruction to select a sequence of operations of the handheld user device to be mapped to the custom gesture command;
cause the user interface to receive, in response to the instruction to select the sequence of operations, user selection of the sequence of operations of the handheld user device to be mapped to the custom gesture command; and
map the custom gesture command to the sequence of operations of the handheld user device.

17. The apparatus of claim 16, wherein the at least one processor is further configured to:
capture information identifying the user of the handheld user device.

18. The apparatus of claim 17, wherein the information identifying the user of the handheld user device comprises voice recognition data representing a voice of the user, facial recognition data representing a face of the user, login information of the user, or any combination thereof.

19. The apparatus of claim 17, wherein the at least one processor is further configured to:
map the information identifying the user to the custom gesture command and the sequence of operations of the handheld user device.

20. The apparatus of claim 16, wherein the at least one processor is further configured to:
cause at least one camera to capture a second custom gesture command, wherein the second custom gesture command comprises a physical gesture performed by a second user of the handheld user device;
cause the user interface to receive user selection of one or more operations of the handheld user device; and
map the second custom gesture command to the one or more operations of the handheld user device.

21. The apparatus of claim 16, wherein the at least one processor is further configured to:
detect the custom gesture command;
identify the sequence of operations of the handheld user device mapped to the custom gesture command; and
perform the sequence of operations of the handheld user device mapped to the custom gesture command.

22. The apparatus of claim 21, wherein the at least one processor is further configured to:
identify the user based on information identifying the user of the handheld user device stored in a user profile on the handheld user device,
wherein the sequence of operations of the handheld user device are identified based on a match between the custom gesture command and the information identifying the user.

23. The apparatus of claim 21, wherein the at least one processor is further configured to:
  enter a custom gesture command input mode before detection of the custom gesture command; and
  exit the custom gesture command input mode after performance of the sequence of operations of the handheld user device mapped to the custom gesture command.

24. The apparatus of claim 23, wherein the custom gesture command input mode is entered in response to detection of a voice command from the user, and wherein the custom gesture command input mode is exited in response to detection of a voice command from the user.

25. The apparatus of claim 23, wherein the custom gesture command input mode is entered in response to detection of a first gesture command performed by the user, and wherein the custom gesture command input mode is exited in response to detection of a second gesture command performed by the user.

26. An apparatus for recording a custom gesture command, comprising:
  at least one a front-facing image capturing means and a rear-facing image capturing means of a handheld user device;
  a user interface means of the handheld user device; and
  a processing means of the handheld user device configured to:
    cause the front-facing image capturing means and the rear-facing image capturing means to capture the custom gesture command, wherein the custom gesture command comprises a gesture and a hand gesture performed by a user of the handheld user device, and wherein the front-facing image-capturing means captures the facial gesture of the user and the rear-facing image-capturing means captures the hand gesture of the user;
    cause the user interface means to display an instruction to select a sequence of operations of the user device to be mapped to the custom gesture command;
    cause the user interface means to receive, in response to the instruction to select the sequence of operations, user selection of the sequence of operations of the handheld user device to be mapped to the custom gesture command; and
    map the custom gesture command to the sequence of operations of the handheld user device.

27. A non-transitory computer-readable medium storing computer-executable instructions for recording a custom gesture command, the computer-executable instructions comprising:
  at least one instruction instructing a front-facing camera and a rear-facing camera of a handheld user device to capture the custom gesture command, wherein the custom gesture command comprises a facial gesture and a hand gesture performed by a user of the handheld user device, and wherein the front-facing camera captures the facial gesture of the user and the rear-facing camera captures the hand gesture of the user;
  at least one instruction instructing a user interface of the handheld user device to display an instruction to select a sequence of operations of the handheld user device to be mapped to the custom gesture command;
  at least one instruction instructing the user interface of the handheld user device to receive, in response to the instruction to select the sequence of operations, user selection of the sequence of operations of the handheld user device to be mapped to the custom gesture command; and
  at least one instruction instructing the handheld user device to map the custom gesture command to the sequence of operations of the handheld user device.

* * * * *